US012440741B2

(12) United States Patent
Nedeau et al.

(10) Patent No.: US 12,440,741 B2
(45) Date of Patent: Oct. 14, 2025

(54) SIMULATION SYSTEM AND METHOD

(71) Applicant: Virtual Round Ballers, Inc., North Muskegon, MI (US)

(72) Inventors: Nicholas J. Nedeau, North Muskegon, MI (US); Christine M. Nedeau, North Muskegon, MI (US); Brandon Lee Christopher Khan, Williamsburg, VA (US)

( * ) Notice: Subject to any disclaimer, the term of this patent is extended or adjusted under 35 U.S.C. 154(b) by 427 days.

(21) Appl. No.: 17/992,618

(22) Filed: Nov. 22, 2022

(65) Prior Publication Data
US 2023/0158388 A1 May 25, 2023

Related U.S. Application Data

(60) Provisional application No. 63/282,524, filed on Nov. 23, 2021.

(51) Int. Cl.
*A63B 69/00* (2006.01)
*A63B 71/06* (2006.01)

(52) U.S. Cl.
CPC ...... *A63B 69/0071* (2013.01); *A63B 71/0622* (2013.01); *A63B 2071/0636* (2013.01); *A63B 2071/0638* (2013.01); *A63B 2071/0666* (2013.01); *A63B 2220/10* (2013.01); *A63B 2220/62* (2013.01); *A63B 2220/803* (2013.01); *A63B 2220/833* (2013.01)

(58) Field of Classification Search
CPC ........ A63F 13/812; A63F 13/65; A63F 13/25; A63B 2220/833; A63B 2220/803; A63B 2220/62; A63B 2220/10; A63B 2071/0666; A63B 2071/0638; A63B 2071/0636; A63B 71/0622; A63B 69/0071

USPC .......................................................... 473/415
See application file for complete search history.

(56) References Cited

U.S. PATENT DOCUMENTS

| 7,369,038 B1 * | 5/2008 | Thompson ......... A63B 71/0605 340/665 |
| 8,617,008 B2 * | 12/2013 | Marty ...................... G06T 7/70 473/422 |
| 10,510,189 B2 * | 12/2019 | Numaguchi ............ A63F 13/55 |
| 10,607,412 B2 * | 3/2020 | Utagawa ............... G06T 19/006 |

(Continued)

FOREIGN PATENT DOCUMENTS

| JP | 2016047219 | 4/2016 |
| JP | 2020534041 | 11/2020 |
| WO | 2019190027 | 10/2019 |

OTHER PUBLICATIONS

International Search Report and the Written Opinion of the International Searching Authority issued in connection with International Application No. PCT/US2022/050756, Mar. 20, 2023 (10 pages).

*Primary Examiner* — Michael A Cuff (57) ABSTRACT

A simulation system in which an amateur player may obtain an assessment of how the amateur players skills compare to those of an average professional athlete or a selected professional athlete that takes into consideration the physical differences between the amateur player and the professional athlete. Measurements of an amateur player are obtained and compared to those of a professional athlete. Such comparisons are used to adjust parameters for a physical or virtual simulation that may be used to assess the abilities of amateur player relative to that of the professional athlete.

20 Claims, 7 Drawing Sheets

(56) References Cited

U.S. PATENT DOCUMENTS

| | | | |
|---|---|---|---|
| 11,033,807 B2 * | 6/2021 | Raghoebardajal | G06F 3/0346 |
| 11,590,421 B2 * | 2/2023 | Konno | A63F 13/56 |
| 11,890,546 B2 * | 2/2024 | Ariyama | A63F 13/35 |
| 2003/0031358 A1 | 2/2003 | Truxa et al. | |
| 2008/0234074 A1 * | 9/2008 | Docherty | A63B 63/083 |
| | | | 473/451 |
| 2013/0266918 A1 * | 10/2013 | Tinjust | A63B 24/0087 |
| | | | 700/91 |
| 2016/0051880 A1 * | 2/2016 | Hoffman | A63B 63/007 |
| | | | 473/447 |
| 2017/0046967 A1 * | 2/2017 | Sundquist | A63B 69/00 |
| 2018/0339215 A1 | 11/2018 | Hu et al. | |
| 2020/0265741 A1 * | 8/2020 | Rhee | G06Q 30/0631 |
| 2020/0408480 A1 * | 12/2020 | Kur | G01P 13/00 |
| 2021/0290053 A1 * | 9/2021 | Tran | G02B 27/0093 |

* cited by examiner

SIMULATION SYSTEM AND METHOD

CROSS-REFERENCE TO RELATED APPLICATIONS

The present claims benefit of priority to Nedeau, et al., U.S. Provisional Patent Application Ser. No. 63/282,524 filed Nov. 23, 2021, and entitled "Simulation System and Method." The entire contents of such application are incorporated herein by reference.

FIELD OF DISCLOSURE

The present subject matter relates to simulation systems and method and more particularly, a simulation system and method to simulate comparative performance of individuals having different physical characteristics.

BACKGROUND

An amateur or recreational player may wish to compare their abilities with those of a professional athlete (i.e., one who plays individually on a professional circuit, on a professional team, for a college or university, and the like). However, in certain sports anatomical differences (height, arm span, hand span, etc.) make it difficult to directly compare the performance of an amateur player and a professional athlete, even if the amateur player is highly trained, capable, and/or motivated.

SUMMARY OF THE DISCLOSURE

A simulation system in which an amateur player may obtain an assessment of how skills of the amateur player compare to those of an average professional athlete or a selected professional athlete that takes into consideration the physical differences between the amateur player and the professional athlete. In addition, the simulation may be used to compare the abilities of any two athletes while taking into consideration differences in the physical characteristics of the two athletes.

According to one aspect, a simulation system includes a processor, a head-mounted display, a position sensing device, and a storage device having instructions stored therein. When executed, the instructions cause the processor to receive user characteristics associated with a user in a physical environment where the motion sensing device is disposed, generate and display a 3-dimensional virtual environment in the head-mounted display, select a destination location in the virtual environment, and receive from the position sensing device first position data over a period of time, wherein the first position data includes a first plurality of positions of the user in the physical environment. The instructions further cause the processor to develop second position data from the first position data, wherein the second position data includes a second plurality of positions associated with the user in the virtual environment, and determine from the second position data, a path and a first amount of time required for the virtual user to move from a predetermined starting location in the virtual environment to the destination location in the virtual environment. The instructions also cause the processor to develop a second amount of time from the first amount of time in accordance with the user characteristics and select predetermined content from a plurality of predetermined content in accordance with the path and the second amount of time.

According to another aspect, a basketball simulation system includes a head set, a position sensor, a content database, and a controller. The controller develops a measurement of a physical characteristic of a player, and generates and displays in the head set worn by the player a virtual basketball court scene comprising a starting location, a destination location, and an opponent. The controller further receives from the position sensor first positions of the player in a physical environment, translates the first positions of to second positions of a virtual player represented in the virtual basketball court scene, determines an amount of time required for the position of the virtual player to move from a starting location to a destination location, and determines an outcome in accordance with the amount of time and displays in the head set content from the content database in accordance with the outcome. At least one of the second positions and the amount of time is determined in accordance with the physical characteristic.

According to yet another aspect, a computer-implemented method of undertaking a simulation using a head-mounted display and a position sensing device includes the steps of receiving user characteristics associated with a user in a physical environment where the motion sensing device is disposed, generating and displaying a 3-dimensional virtual environment in the head-mounted display; selecting a destination location in the virtual environment, and receiving from the position sensing device first position data over a period of time, wherein the first position data includes a first plurality of positions of the user in the physical environment. The computer-implemented method also includes developing second position data from the first position data, wherein the second position data includes a second plurality of positions associated with the user in the virtual environment, and determining from the second position data, a path and a first amount of time required for the virtual user to move from a predetermined starting location in the virtual environment to the destination location in the virtual environment. In addition, the computer-implemented method includes developing a second amount of time from the first amount of time in accordance with the user characteristics and selecting predetermined content from a plurality of predetermined content in accordance with the path and the second amount of time.

DETAILED DESCRIPTION

As noted above, the performance of an amateur player (or amateur athlete) and professional athlete (or professional player) cannot be directly compared because of anatomical or physical difference therebetween. For example, for comparing abilities for playing basketball, physical differences between the amateur player and the professional athlete with respect to hand span, hand size length, hand size span, wingspan or standing reach with arms extended, standing reach, standing vertical jump distance, and the like typically endow the professional athlete with capabilities well beyond those of smaller size and stature. Such physical disparities may affect and result the difference in the abilities of the amateur player versus the professional athlete. Many amateur players desire to evaluate how they could perform relative to the professional athlete if they possessed the same anatomical advantage as the professional athlete i.e., simulating or scaling the performance of amateur player relative anatomical difference between the amateur player and the professional athlete.

For example, Table 1 shows the average hand size length and hand size span of professional male, i.e., a National Basketball Association (NBA) player, a professional female basketball player, i.e., a Women's National Basketball Association (WNBA), an U.S. average male, and an average U.S. female. The hand size length is a measure of a distance between the base of a palm of an extended hand to the tip of a middle finger of such hand. The hand size span is a measure of the distance between a tip of a thumb of an outstretched hand and a tip of the pinky of the outstretched hand. In some embodiments, the hand size length and the hand size span may be combined (i.e., added together) to develop a combined hand measurement. Table 1 also shows the regulation circumferences of the basketballs used in games of the National Basketball Association (NBA) in the row titled "NBA BALL SIZE" and games of the Women's National Basketball Association (WNBA).

However, having the average sized amateur player use a basketball having a circumference that has been adjusted for the physical differences in hand size length, hand size span, and other metrics between the average sized player and the professional athlete would provide a better assessment of the anatomically scaled abilities of the average size player compared to professional athlete. Table 1 also shows linear scaling of the ball size (i.e., circumference) based on the average difference in the combined hand size of the amateur player versus the professional athlete. The scaling of the ball size may vary according to any formula chosen for application in a specific performance adjustment or scaling of the amateur player relative to the professional athlete. Further, it should be apparent that the performance of the amateur player who has hand measurements larger than that of the professional athlete could be assessed using a basketball having a circumference larger than that of the regulation sized basketball.

Another physical attribute that can contribute to the difference in performance between an amateur player and the professional athlete is standing reach. The standing reach is the distance between the ground on which a player is standing and a furthest point reached by an upwardly extended hand of an upwardly arm of the player. Table 2 shows estimates of the standing reaches of the average U.S. male and female amateur players and the average professional basketball players. Given the difference in such standing reach, having the amateur player try to shoot a basketball into a basket positioned at a regulation rim height either by dunking or throwing would not be an accurate assessment of the shooting ability of the amateur player relative to that of the professional athlete.

TABLE 1

| | HAND SIZE LENGTH | HAND SIZE SPAN | COMBINED HAND MEASUREMENT | REGULATION BALL SIZE | ADJUSTED BALL SIZE ADJUSTED |
|---|---|---|---|---|---|
| NBA PLAYER | 8.9" | 9.75" | 18.65" | 29.635" | N/A |
| AVERAGE MALE | 7.6" | 8.6" | 16.2" | 29.635" | 25.74" |
| WNBA PLAYER | 7.12" | 6.91" | 14.03" | 28.5" | N/A |
| AVERAGE FEMALE | 6.8" | 7.0" | 13.8" | 28.5" | 27.50" |

Given the physical differences in the combined hand sizes of the average player and the professional athlete, measuring the performance during an assessment that requires ball handling skills (e.g., ability to shoot a basket, speed and control while dribbling a basketball, etc.) undertaken by an average sized amateur male or female player using a regulation NBA or WNBA basketball, respectively, and comparing such measurement with that of the professional NBA or WNBA athlete, respectively, would not provide an accurate assessment of capability of the average sized amateur player.

Rather, to assess the shooting ability of the amateur player, the standing reach of the amateur player may be measured, and the rim height of the basket may be adjusted in accordance with a difference between the standing reach of the amateur player and that of the professional athlete. Table 2 also shows adjustment of a rim heights by again linearly scaling the rim height based on the relative heights of professional versus amateur athlete.

TABLE 2

| | AVERAGE AMATEUR REACH MEASUREMENTS | PROFESSIONAL BASKETBALL PLAYER | PROFESSIONAL REGULATION RIM HEIGHT | ADJUSTED RIM HEIGHT |
|---|---|---|---|---|
| MALE | 82.80" | 103.68" | 10' | 7.99' |
| FEMALE | 64.00" | 71.00" | 10' | 9.0' |

The difference in height between the amateur player and the professional athlete may also need to be compensated for when assessing the ability of the amateur player. For example, a shorter (taller) player may be assessed on a court that is smaller (larger) than that used by a professional athlete. For example, the area of the free throw line to the portion of the court where the basket is located (also known as the free throw lane) may be adjusted in accordance with a chosen scaling criteria to reflect the physical size/height differences between the amateur player and the professional athlete. Doing so may provide an accurate experience (or feeling) to the amateur player of what the professional player experiences when traversing the free throw lane (e.g., when dunking the basketball) and how such amateur player would stack up against the professional athlete given the same physical attributes.

In some embodiments, a standing vertical jump distance of the amateur player may be measured. The standing vertical jump distance is a distance between the ground and a highest point the amateur player is able to reach with outstretched fingers of an outstretched arm by jumping from an initial position in which both feet are flat on the ground. Such standing vertical jump distance may be measured manually or electronically using a vertical jump measuring device such as a Vertec, using a smartphone application such as "What's My Vertical," or another tool apparent to one who has ordinary skill in the art. In some cases, a net standing vertical jump distance may be calculated by subtracting the standing reach of the amateur player from the standing vertical jump distance.

For example, on a regulation sized court, a professional athlete who is 7 feet tall may take two strides to traverse the court from the free throw line to the hoop when dunking the ball. On a similarly size court, the amateur player who stands, for example, 5 feet 10 inches, may require four strides to traverse the same distance.

On a regulation court, the entire free throw lane area, or "paint," measures 16 feet×15 feet, resulting in a total area of 240 sq. ft. (16'×15'). Such area may be reduced in a simulation to compensate for the difference in height and, if desired, leg span differences between the amateur player and the professional athlete.

In one embodiment, a dunk coefficient may be calculated from the physical characteristics of the amateur player that reflects the differences between such physical characteristic and those of a professional athlete with whom the ability of the amateur player is being compared. The differences that are used to calculate the dunk coefficient include differences in the hand size length, hand size span, height, inseam, standing reach, standing vertical jump distance, and/or net standing vertical jump distance. In one embodiment, the dunk coefficient is the sum of the percentage differences between corresponding measurements of the physical characteristics of the amateur player and the professional athlete. Such dunk coefficient may then be used to adjust the basketball size, rim height, and court size used when the amateur player attempts to try to dunk a basketball a predetermined number of times. The number of times the amateur player is able to successfully dunk the ball in such compensated environment provides an assessment of the ability of the amateur player relative to the professional athlete. The dunk coefficient may also be used to adjust an amount of time the amateur player is provided to respond to an event in a physical or virtual simulation.

In view of the foregoing, a simulation system may be developed in which an amateur player may obtain an assessment of how the skills of the amateur player compare to those of an average professional athlete or a selected professional athlete that takes into consideration the physical differences between the amateur player and the professional athlete. Indeed, the simulation may be used to compare the abilities of any two athletes while taking into consideration differences in the physical characteristics of the two athletes.

In one case, the simulation system provides adjustments that should be made to the equipment used during the assessment (e.g., a basketball circumference) and the area (e.g., a basketball court) where the assessment will be conducted. In another case, the simulation uses the parameters to develop a virtual simulation in which the abilities of the amateur player may be dynamically measured and adjusted in real time.

Figure 1:
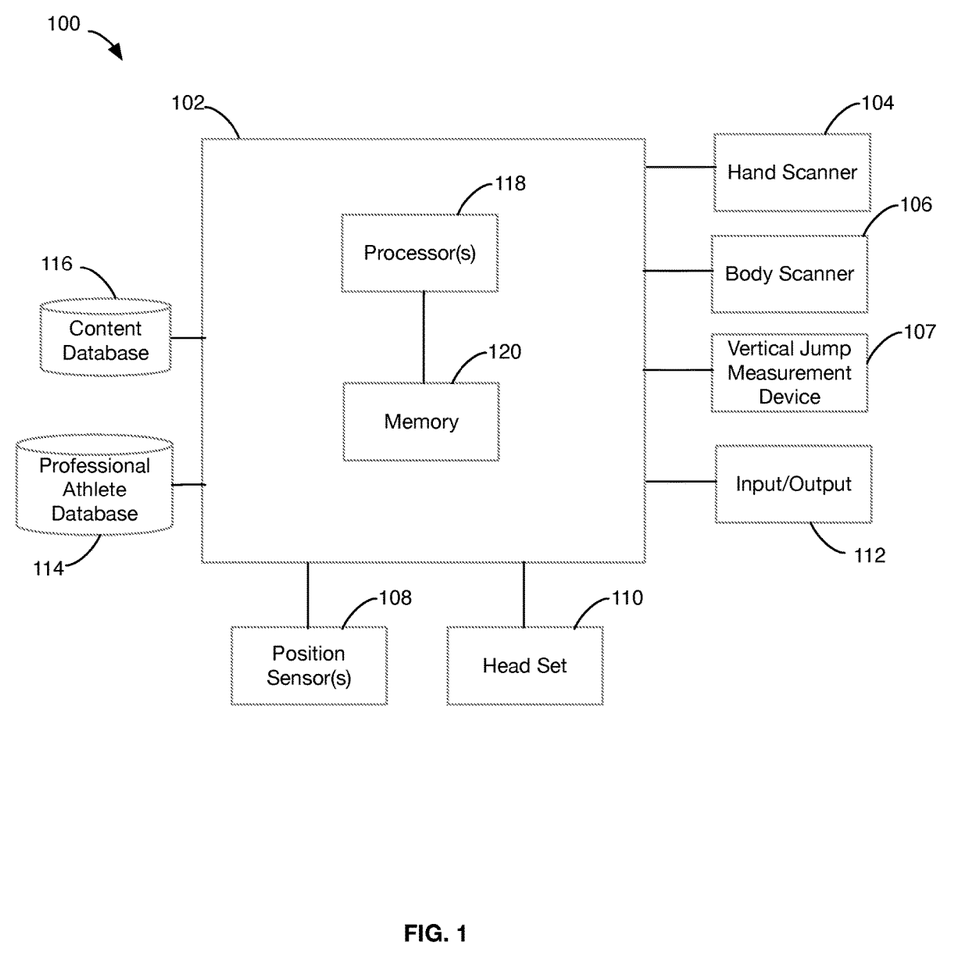
FIG. 1 is a block diagram of a simulation system.

FIG. 1 shows a block diagram of a simulation system 100 that may be used to assess the abilities of the amateur player compared to the professional athlete. The simulation system 100 comprises a controller 102, a hand scanner 104, a body scanner 106, a vertical jump measurement device 107, one or more position sensor(s) 108, a head mounted display in the form of head set 110, and one or more input and output device(s) 112. In addition, the simulation system 100 includes a professional athlete database 114 having information regarding the physical characteristics of one or more professional athletes against whom the performance of the amateur player may be compared and a content database 116.

In addition, controller 102 includes one or more processor(s) 118 and a memory 120 The input and output device(s) may be, for example, a tablet computer, a smartphone, a personal computer, or peripheral input/output devices coupled to the controller 102. Such peripheral input/output device(s) may comprise a computer monitor, a keyboard, a mouse, a trackpad, a touchscreen, and the like.

Figure 2:
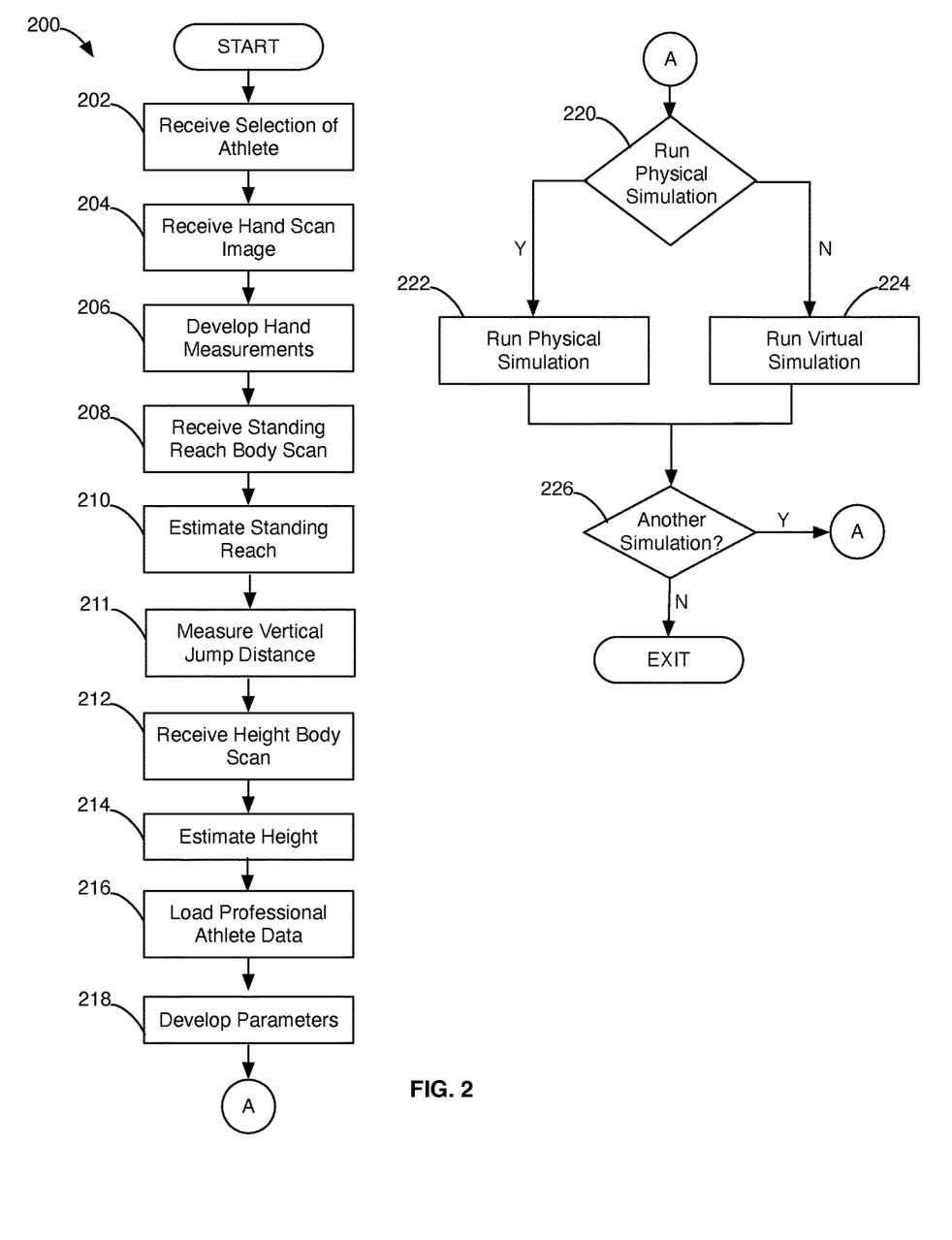
FIG. 2 is a flowchart of steps undertaken by a controller of the simulation system to FIG. 1 to generate a simulation.

FIG. 2 shows a flowchart 200 of steps undertaken by the controller 102 to generate a simulation. Referring to FIG. 2, at step 202, the controller 102 receives a selection of the professional athlete against whom abilities of the amateur player are to be compared.

At step 204, the controller 102 instructs the amateur player, via a message displayed on the input/output device 112, to place a hand thereof on the hand scanner 104 and receives from the hand scanner 104 two images of the amateur player's hand. A first image is acquired after the amateur player places a hand thereof flat and palm down on the hand scanner 104 with fingers of the hand together. A second image is acquired with the hand of the amateur flat and palm down on the hand scanner 104 with fingers and thumb of the hand splayed apart.

At step 206, the controller 102 analyzes the first and second images of the hand using image processing and photogrammetry techniques to automatically measure the hand size length and the hand size span of the amateur player from the first and second images, respectively, and calculate the combined hand measurement.

At step 208, the controller 102 instructs the amateur player via the input/output device 112 to stand proximate the body scanner 106 with feet flat and one arm and a hand of the arm extended upward. The controller 102, also at step 208, operates the body scanner to scan the body of the amateur player and receives body scan information. At step 210, the controller 102 uses the body scan information to estimate the standing reach of the amateur player.

At step 211, the controller 102 instructs the amateur player to use the vertical jump measurement device 107 and, also at step 211, receives the standing vertical jump distance the amateur player can reach. In some embodiments, the controller 102, also at step 211, calculates the net standing vertical jump distance as described above.

At step 212, the controller 102 instructs the amateur player via the input/output device 112 to stand proximate the body scanner 106 with feet flat and both arms lowered. Thereafter, the controller 102, also at step 212, operates the body scanner to scan the body of the amateur player and receives body scan information and, at step 214, determines from such body scan information an estimate of a height of the amateur player.

In some embodiments, instead of measuring the hand size length, hand size span, standing reach, height information, and/or standing vertical jump distance of the amateur player using a hand scanner, body scanner, or electronic vertical jump distance measuring device (as appropriate), one or more of these measurements may be obtained manually using a measuring device and entered using the input/output device 112.

At step 216, the controller 102 loads from the professional athlete database 114, the hand size length, hand size span, standing reach, standing vertical jump distance, and height information of the professional athlete selected at step 202.

At step 218, the controller 102 uses the hand size length, hand size span, standing reach, standing vertical jump distance, and height information of the amateur player developed at steps 206, 210, and 214, and those of the professional athlete loaded at step 216 to develop parameters for the simulation.

In particular, at step 218, the controller 102 calculates an adjusted circumference of a basketball to use during the simulation by multiplying the circumference of an NBA or WNBA regulation sized basketball, based on a league with which the professional athlete is associated, by the ratio of the combined hand size of amateur player and the combined hand size of the selected professional athlete, respectively.

Also at step 218, the controller 102 uses the standing reach, standing vertical jump distance, and/or net standing vertical jump distance to determine an adjusted rim height to use for the simulation by multiplying regulation rim height used in a professional basketball arena by a ratio of the measured standing reach (or standing vertical jump distance) of the amateur player and the standing reach (or standing vertical jump distance) of the selected professional athlete.

In addition, also at step 218, the controller 102 uses the height of the amateur player determined at step 214 to determine an adjust court area and an adjusted free throw line distance (i.e., an adjusted distance between the free throw line and the rim).

The adjusted court area is determined by multiplying the regulation court area of a professional basketball arena by a ratio of the height of the amateur player and the height of the selected professional athlete. Similarly, the adjusted free throw distance is determined by multiplying the regulation distance between the free throw line and the rim of the professional basketball arena by a ratio of the height of the amateur player and the height of the selected professional athlete.

For example, to assess the ability of the average amateur player who has a height of 70 inches to a professional athlete who has a height 84 inches, the paint area of the court may be geometrically reduced by multiplying the regulation paint area (240 square feet) by a ratio of the height of the amateur player and the professional athlete (i.e., multiplied by 0.833). Doing so, provides an adjusted area of the paint that is 199.99 square feet (i.e., 240 square feet×0.833). The adjusted length and adjusted width of the court may then be determined in accordance with the reduced area. In another embodiment, a width (16') and a length (15') of the paint may be linearly scaled by the ratio (0.833) by the ratio of the heights of the amateur player and professional athlete to have an adjusted width of 13.3' and an adjusted length of 12.5'.

Further, the distance between the free throw line and the rim may be adjusted by multiplying the regulation free throw line distance (15 feet) by 0.833 to obtain an adjusted free throw line distance of 12.85 feet (15 feet×0.833=12.85 feet). Doing so, appropriately reduces the number of steps the amateur player must take from the free throw line to the rim to dunk a basketball.

At step 220, the controller 102 queries the amateur player via the input/output device 112 (FIG. 1) whether a physical simulation should be run or a virtual simulation should be run. If a physical simulation should be run, the controller 102 proceeds to step 222, otherwise the controller 102 proceeds to step 224. The operation of the controller 102 at steps 222 and 224 are described in greater detail below.

After the simulation is run at either step 222 or step 224, the controller 102 queries the amateur player, at step 226, whether the parameters determined at step 218 should be used for another simulation run and if so, returns to step 220. Otherwise, the controller 102 exits.

If the amateur player chooses to run a physical simulation at step 220, then at step 222 the controller 102 displays on the input/output device 112, the parameters of the physical simulation calculated at step 218 including the adjusted basketball circumference, the adjusted rim height, adjusted court size, and/or the adjusted free throw line distance. A simulation area is created in accordance with the adjusted rim height, adjusted court size, and/or the adjusted free throw line distance. The amateur player is provided a basketball having a circumference identical to or similar to the adjusted basketball circumference and is then directed to undertake one or more assessment activities including attempting to shoot baskets from the adjusted free throw line to a basket positioned at the adjusted rim height, attempting to run and dunk one or more basket(s) from the adjusted free throw line to the basket, etc. The success rate, i.e., the proportion of successful baskets relative to the number attempts for each of activity can be calculated. The success rate of the amateur player using the basketball with an adjusted circumference in an adjusted environment can be compared to the success rate of the professional athlete using a regulation basketball in a regulation environment to assess the skill of the amateur player.

If, at step 220, the amateur player chooses to run a virtual simulation, a variety of virtual reality- or augmented reality- based skills tests may be generated by the controller 102 with the head set 110 providing an immersive environment in which the amateur player undertakes such skills tests. In such simulation, the position sensor(s) 108 track(s) movement of the amateur player and the controller 102 adjusts the immersive environment generated in the head set 110 in response to position information received from the position sensor(s) 108.

Figure 3:
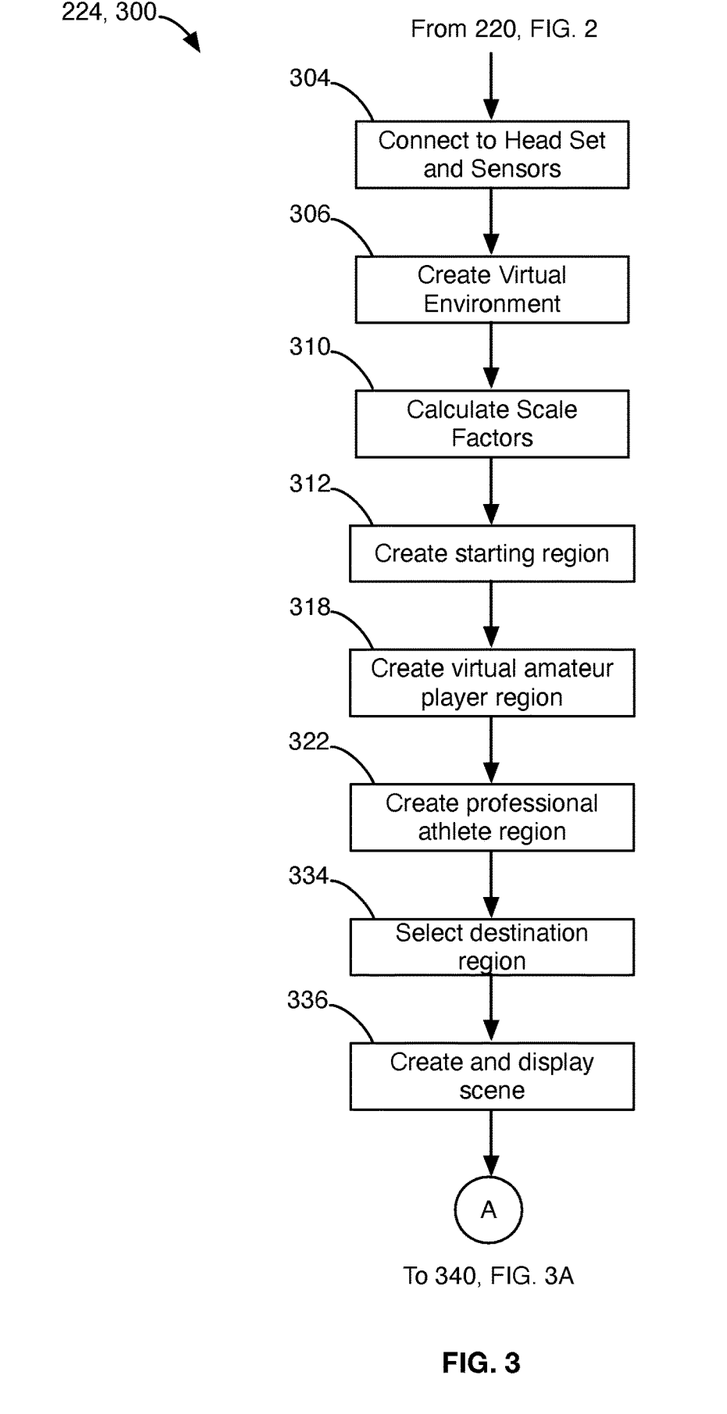
FIGS. 3, 3A, and 3B show a flowchart of steps undertaken by a controller of the simulation system of FIG. 1 during a virtual simulation.

FIG. 3 shows a flowchart 300 of steps undertaken by the controller 102 at step 224 of FIG. 2 to run one embodiment of the virtual simulation. In particular, FIG. 3 shows the steps undertaken in a basketball block-charge assessment in which the amateur player must defend against professional athlete attempting to make a basket. It should be apparent to one who has ordinary skill in the art that the embodiment shown in FIG. 3 may be modified for other types of assessments including, for example, a blow-by assessment in which an amateur player must dribble past a defending professional athlete, a shooting the ball assessment in which the amateur player must shoot the basket within a predetermined amount of time while the professional athlete attempts to block the shot, a jump shot blocking assessment in which the amateur player tries to block a jump shot attempt by the professional athlete, and the like.

Figure 4:
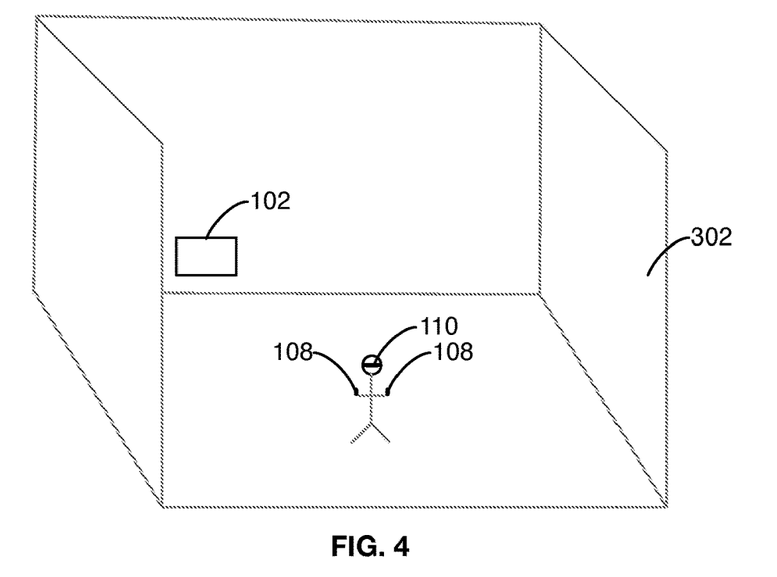
FIG. 4 is isometric view of a physical environment in which a simulation is conducted using the simulation system of FIG. 1.
Figure 5:
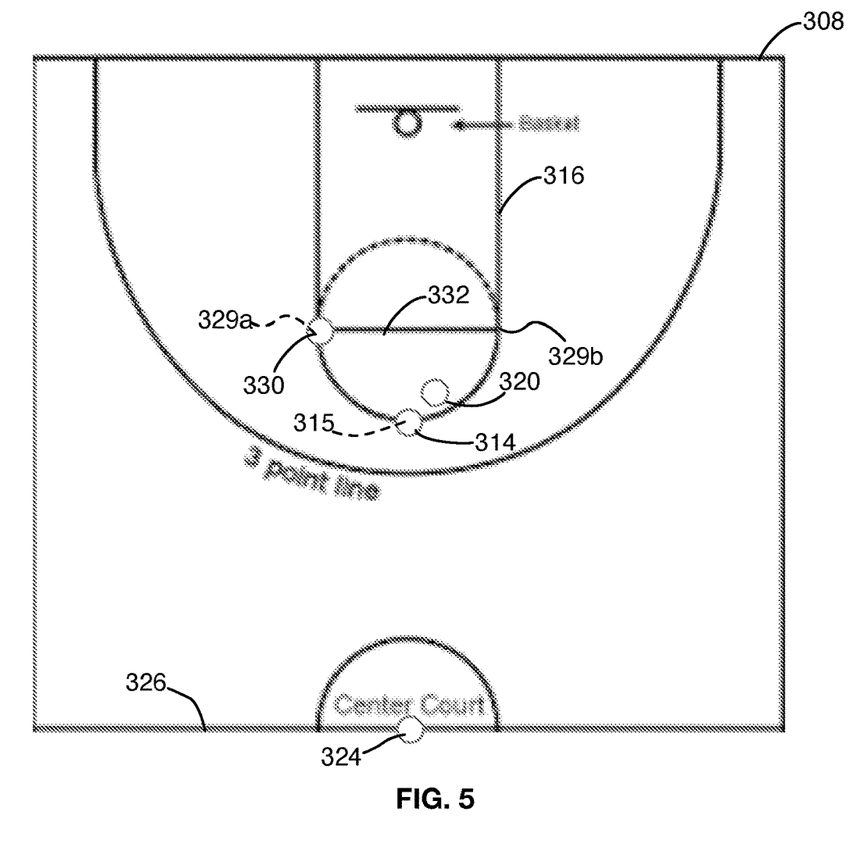
FIG. 5 is a plan view of a virtual environment generated by the simulation system of FIG. 1.

Referring to FIGS. 3-5, the amateur player is outfitted with the head set 110 and the one or more position sensor(s) 108 and placed in a physical environment 302 (FIG. 4). In some embodiments, the position sensor(s) 108 may be attached to or integrated with the head set 110.

At step 304, the controller 102 connects to the position sensor(s) 108 and the head set 110 so that the controller 102 can track the position of the amateur player in the physical environment 302 and generate and update a virtual scene that is displayed in the head set 110.

At step 306, the controller 102 generates in the memory 120 a virtual environment 308 (FIG. 5) that represents a basketball court. At step 310, the controller 102 calculates one or more scale factors that are used to translate movement (e.g., walking, running, turning, etc.) by the amateur player in the physical environment 302 as determined using the position sensor(s) 108 to movement of a representation of the amateur player in the virtual environment 308. In some embodiments, left-right and front-rear scale factors may be calculated to translate left-right and forward-backward movements of the amateur player in the physical environment 302 to movement of the representation of the amateur player in the virtual environment 308. Further, in some embodiments, a vertical scale factor may be calculated that is applied to measurements of vertical movement of the amateur player (e.g., if the amateur player ducks or jumps) in the physical environment 302 to vertical movement of the representation of the amateur player in the virtual environment 308. In some embodiments, the calculated scale factors may be adjusted in accordance with the physical characteristics of the amateur player determined at step 218 (FIG. 2).

In some embodiments, the controller 102, also at step 310, may query the amateur player via the input/output device 112, to select from different methods of scaling the movement of the amateur player in the physical environment 302 to movement of the representation of amateur player in the virtual environment 308 in accordance with differences in the physical characteristics between the amateur player and the selected professional athlete. Such selection may include one or more of, to scale the dimensions of the virtual environment, to scale the speed of the representation of the amateur player, to scale the size of the representation of the amateur player, etc.

At step 312, the controller 102 creates a representation of a starting region 314 in the virtual environment 308. The representation of the starting region 314 is a 3-dimensional volume such as a cylinder, a prism, a sphere, and the like, and has coordinates that position such volume at a top 315 of a key 316 of the basketball court represented in the virtual environment 308.

At step 318, the controller 102 creates a representation of a virtual amateur player 320 in the virtual environment 308. Such virtual player 320 is represented by a 3-dimensional volume e.g., a sphere, a prism, a cylinder, a shape of a human body, and the like, in the virtual environment 308. As the amateur player traverses the physical environment 302, the coordinates of the virtual amateur player 320 (e.g., the coordinates of a centroid of the virtual player volume, coordinates of a predetermined point virtual player volume, coordinates of a mesh or a plurality of points that comprise the virtual player volume, etc.) are modified in accordance with the location of the amateur player in physical environment 302 and the scale factors noted herein above. As noted above, location of the amateur player in the physical environment 302 is determined by the location(s) of the one or more position sensor(s) 108 carried by or secured to the amateur player. In one embodiment, the controller 102 initializes the coordinates of the virtual amateur player 320 to be at a location in the virtual environment 308 coincident with or proximate the location of the starting region 314.

At step 322, the controller 102 creates a virtual professional athlete 324 that is represented by the 3-dimensional volume in the virtual environment 308 and initializes coordinates of the virtual professional athlete 324 to be on a center court line 326 of the basketball court represented in the virtual environment 308.

At step 334, the controller 102 randomly selects one of a plurality of destination regions 329 toward which the amateur player will have to move the virtual amateur player 320 during the simulation. As described above, the amateur player changes the position of the virtual amateur player 320 by moving in the physical environment 302. In the example illustrated in the FIG. 5, the destination regions 329a and 329b are located at left and right ends of a free throw line 332 of the basketball court represented in the virtual environment 308.

At step 336, the controller 102 generates and displays a scene in the head set 110 that depicts the basketball court represented in the virtual environment 308 from the perspective of the virtual amateur player 320. In one embodiment, the 3-dimensional volume associated with the virtual player 320 has a front side and a rear side and the scene displayed in the head set 110 is in accordance with the direction in the virtual environment 308 that the front side is facing. As the amateur player in the physical environment 302 rotates, the 3-dimensional volume associated with the virtual player 320 also rotates so that the front side faces different parts of the virtual environment 308.

At step 340, the controller 102 tracks the physical position of the amateur player in the physical environment 302 using position data obtained from the position sensor(s) 108, updates the virtual position of the 3-dimensional representation of the virtual amateur player 320 in the virtual environment 308 in accordance with the physical position of the amateur player and the scale factors described above, and adjusts the scene displayed in the head set 110 in accordance with the virtual position to show the basketball court in the virtual environment from the perspective of the virtual amateur player 320. The controller 102 continues to update the displayed scene in this manner until the amateur player moves in the physical environment 302 such that the 3-dimensional representation of virtual amateur player 320 intersects the 3-dimensional representation of the starting region 314 and remains intersected for at least a first predetermined amount of time (e.g., 1 second). Such sustained intersection indicates that the amateur player is ready to be begin the simulation.

At step 342, the controller 102 generates and displays a virtual professional athlete 324 in the head set 110. In some embodiments, controller 102 retrieves an image or a video of the professional athlete selected at step 202 (FIG. 2) from the content database 116 and displays such image or video in the head set 110 such that the professional athlete appears to be positioned in the virtual environment 308 where the virtual professional athlete 324 is positioned. In other embodiments, the controller 102 retrieves drawing parameters from the content database 116 and generates a 3-dimensional rendition of an avatar that represents the virtual athlete and positions such avatar in accordance with the position of the virtual professional athlete 324.

At step 344, the controller 102 creates in the virtual environment 308, a 3-dimensional volume 330 having coordinates associated with the destination region 329 selected at step 334. The 3-dimensional volume 330 associated with the selected destination region 329 may be a cylinder, a prism, a sphere, and the like. In some embodiments, the controller 102 displays, in the head set 110, the 3-dimensional volume 330 associated with the selected target region 329 (or another indicator positioned at the selected target region 329) when the amateur player moves in the physical environment 302 such that the front side of the 3-dimensional representation of the virtual player 320 faces the selected region 329.

At step 346, the controller 102 starts a timer. At step 348, the controller 102 queries the position sensor(s) 108 to obtain the position of the amateur player in the physical environment 302 and, at step 350, calculates the coordinates of the virtual amateur player 314 in the virtual environment 308.

At step 352, the controller 102 updates the scene displayed in the head set 110 to reflect the position of the virtual amateur player 314, as calculated at step 350, and in accordance with a new position of the virtual professional athlete 324. In one embodiment, the virtual professional athlete 324 is depicted in the scene as dribbling a basketball and moving toward the selected destination region 329 of the virtual environment 308.

At step 354, the controller 102 determines if the 3-dimensional representation of the virtual amateur player 320 intersects the 3-dimensional volume 330 positioned at the destination region 329. If so, the controller 102 proceeds to step 356. Otherwise, the controller 102 returns to step 348 to retrieve another physical position of the amateur player.

At step 356, the controller 102 checks the timer started in step 346 to determine if a second predetermined amount of time has elapsed. If so, the controller 102 proceeds to step 358, otherwise the controller 102 proceeds to step 360.

At step 358, the controller 102 checks if the amateur player in the physical environment 302 is stationary (or has substantially little movement) when the second predetermined time elapses, and if so proceeds to step 362. Otherwise, the controller 102 proceeds to step 364.

If the physical amateur player can move in the physical environment 302 sufficiently fast and accurately that the virtual amateur player 320 is moved in the virtual environment 308 to the target destination 329 and remains stationary before the second predetermined time has elapsed, then the amateur player is determined to have sufficient skill to charge the professional athlete selected at step 202 (FIG. 2).

Thus, at step 362, the controller 102, retrieves from the content database 116 (FIG. 1) content associated with a successful charge foul and displays such content in the head set 110. In some embodiments, such content may be, for example, a video of a referee declaring a charge foul followed by a video of the selected professional player backing away from the virtual amateur player 320. In some embodiments, instead of displaying a view of the referee, the controller 120 generates and displays an avatar of a referee declaring the charge foul in accordance with parameters stored in and retrieved from the content database 116. Similarly, in some cases, the controller 102 generates and displays the avatar of the professional athlete backing away.

If the physical amateur player is able to move in the physical environment 302 sufficiently far so that the virtual amateur player 320 is moved in the virtual environment 308 before the second predetermined time has elapsed but the physical amateur player is not stationary, the physical amateur player is determined to have caused a blocking foul.

In this case, at step 364, the controller 102 retrieves from the content database 116 (FIG. 1) content associated with a blocking foul condition and displays such content in the head set 110. Such content may include a video (or an avatar) of the referee declaring the blocking foul and a video (or the avatar) of the professional player moving laterally as if having collided with the virtual amateur player 320.

If at step 356, the controller 102 determines that the intersection of the 3-dimensional representation of the virtual amateur player 320 and the 3-dimensional volume 330 positioned at target destination 329 occurred after the second predetermined amount of time had elapsed, the controller 102, at step 360, determines if such intersection occurred before a third predetermined amount of time had elapsed. If so, the controller 102 proceeds to step 364 to display content in the head set 110 that is associated with the occurrence of a blocking foul, as described above.

Otherwise, at step 366, the controller 102 retrieves and displays content from the content database 116 associated with a blow-by maneuver. Such content may include a video (or avatar) moving past the virtual amateur player 320, going for a layup at the basket, and returning to the center of the court.

After displaying the appropriate content at steps 362, 364, or 366, the controller 102 proceeds to step 226 (FIG. 2) to determine if the user wishes to undertake another simulation.

Figure 3A:
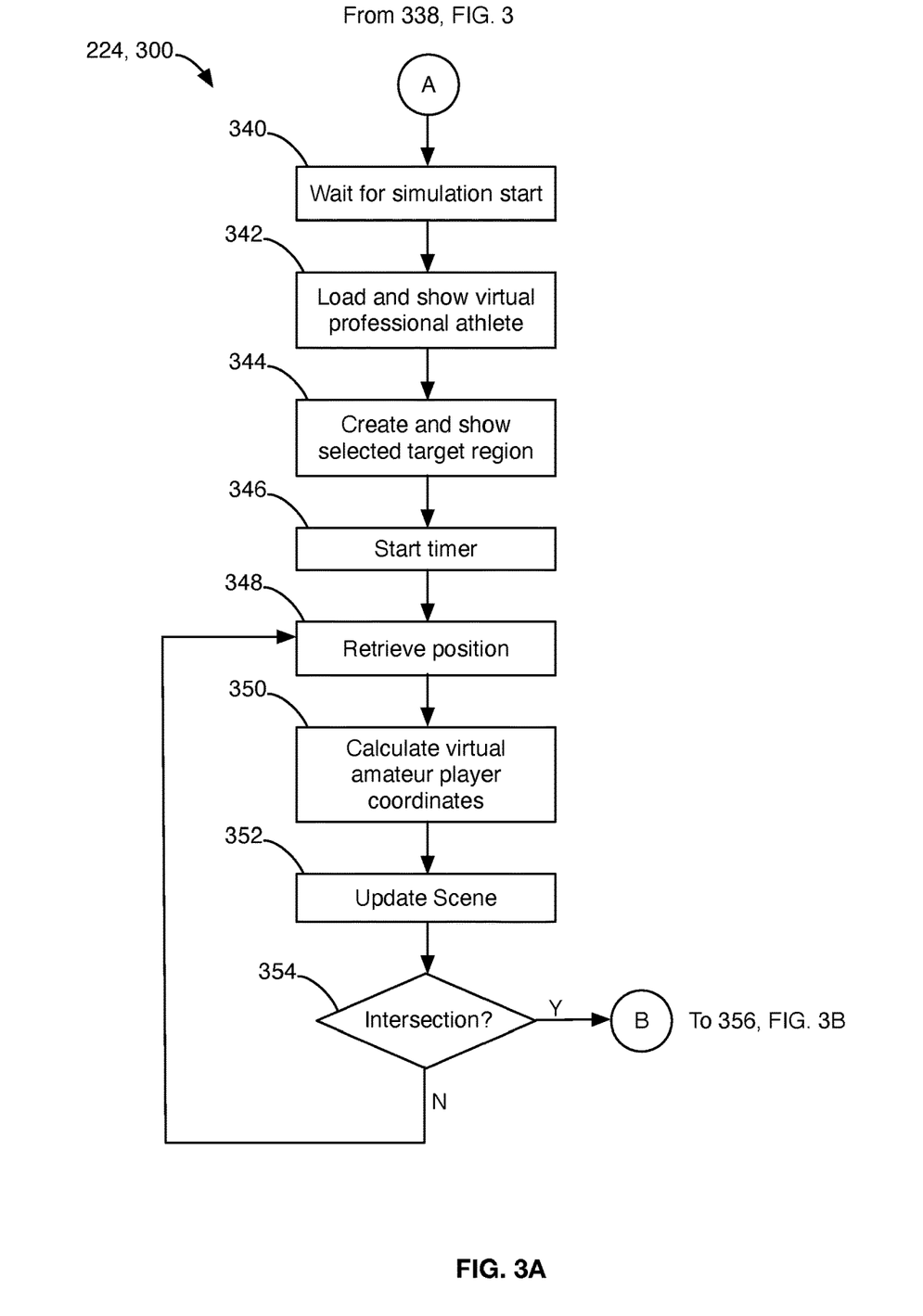

Referring once again to step 352 of FIG. 3A, the controller 102 updates the scene created in the head set 110 to show the virtual professional athlete 324 moving toward the destination region 329 selected at step 334 (FIG. 3) while dribbling a basketball. In some embodiments, the scene generated by controller 102 may include a video from the content database 116 (FIG. 1) that shows the virtual professional athlete 324 moving from the initial position thereof on the center line 326 to the selected target region 329 within a span of a fourth predetermined amount of time. The speed at which the video is played in the head set 110 may be adjusted, if necessary, so that the elapsed time for the virtual professional athlete 324 to move from the initial position thereof at center court to the selected target region 329 during the simulation is approximately identical to the third predetermined amount of time. In some embodiments, instead of incorporating a video in the scene, the controller 102 may generate an avatar of the virtual professional athlete 324 and the position of such avatar in the scene is adjusted each time the scene is updated at step 352.

In some embodiments, the distance (before any adjustment for the differences in physical characteristics of the amateur player and the professional athlete) the amateur player must move in the physical environment 302 to move the virtual representation 320 of the amateur player from the starting region 314 to the destination region 329 is approximately 6 feet. The second predetermined time before being adjusted to traverse this distance is approximately 0.40 seconds and the third predetermined time before being adjusted is approximately 0.45 seconds. Further, the distance the amateur player must traverse to move the virtual representation 320 from the starting region 314 to the destination region 329 and second and/or third predetermined times may be adjusted in accordance with the difference in physical characteristics of the amateur player and the professional athlete. For example, such physical distance or times may be adjusted to compensate for the height differences (that could account directly or indirectly for a variation in leg length between the two) or in accordance with the dunk coefficient described above. Similarly, as noted above, the physical differences between the amateur player and the professional athlete may be compensated for by adjusting the scale factors used to translate movement of the amateur player in the physical environment 302 to movement of the virtual amateur player 320 in the virtual environment 308.

Figure 3B:
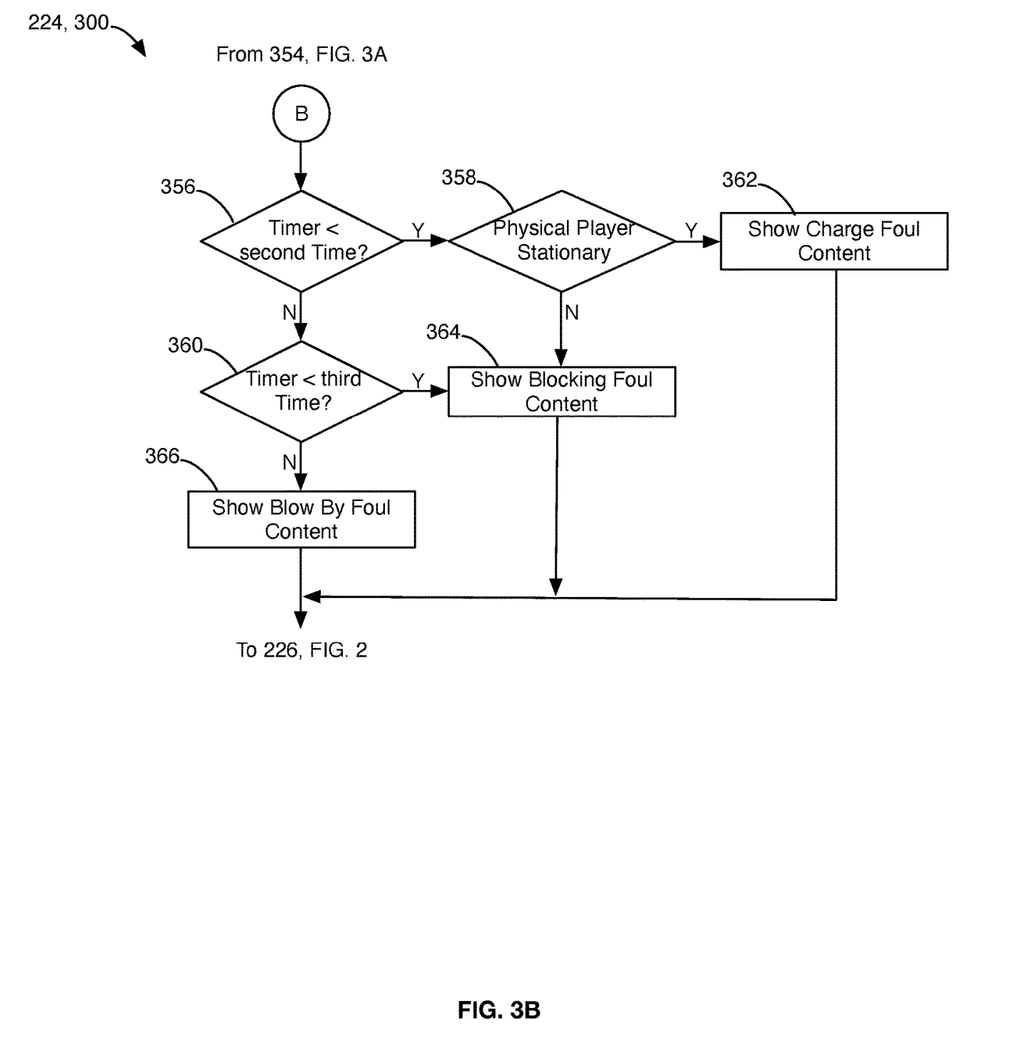

In some embodiments, during a virtual simulation (FIG. 2, step 224), the controller 102 advises the amateur player to move laterally either toward the right or the left thereof (in accordance with the destination region 329 selected at step 334) to try to block the representation 324 of the virtual athlete displayed in the head set 110. In some cases, the destination region 329 may not be displayed in the head set 110. Rather, the amateur player must follow the movement of virtual professional athlete 324 and move accordingly in the physical environment 302 so that the virtual representation 320 of the amateur player is at a location to successfully block the virtual representation 324 of the professional athlete within the second predetermined amount of time, as described above. In such embodiments, the controller 102 undertakes steps 346-366 (FIGS. 3A and 3B) to track the movement and speed of the amateur player in the physical environment 302 and display content at steps 362, 364, 366 (FIG. 3B) selected in accordance with such movement.

In some embodiments, after the simulation has been run at least a predetermined number of times, the controller 102, prior to step 226, evaluates the performance of the amateur player during such simulations, compares such performance with information stored in the professional athlete database 114 (FIG. 1), and identifies an alternate professional athlete that may be more suited to the ability of the amateur player. At step 226, the controller 102 determines from the amateur player if the amateur player would like to undertake a further simulation with the alternate athlete, and if so, proceeds to step 220 with the alternate athlete selected.

In some embodiments, the simulation system 100 (FIG. 1) is configured to allow the amateur player to undertake one or more predetermined practice trials or iterations of the simulation before running a final iteration of the simulation. In some such cases, the simulation system 100 measures how well the amateur player performs during the practice iterations of the simulation and based on such measurements adjusts one or more parameters of a final iteration of the simulation. Such parameters may include one or more of left-right, front-back, and vertical scale factors used to translate movement of the amateur player in the physical environment 302 into movement of the representation of the amateur player in the virtual environment 308 and values of second and third predetermined times. The second and third predetermined times determine whether the amateur player was able to accomplish a charge foul, a blocking foul, or if a blow-by maneuver occurred.

Figure 6:
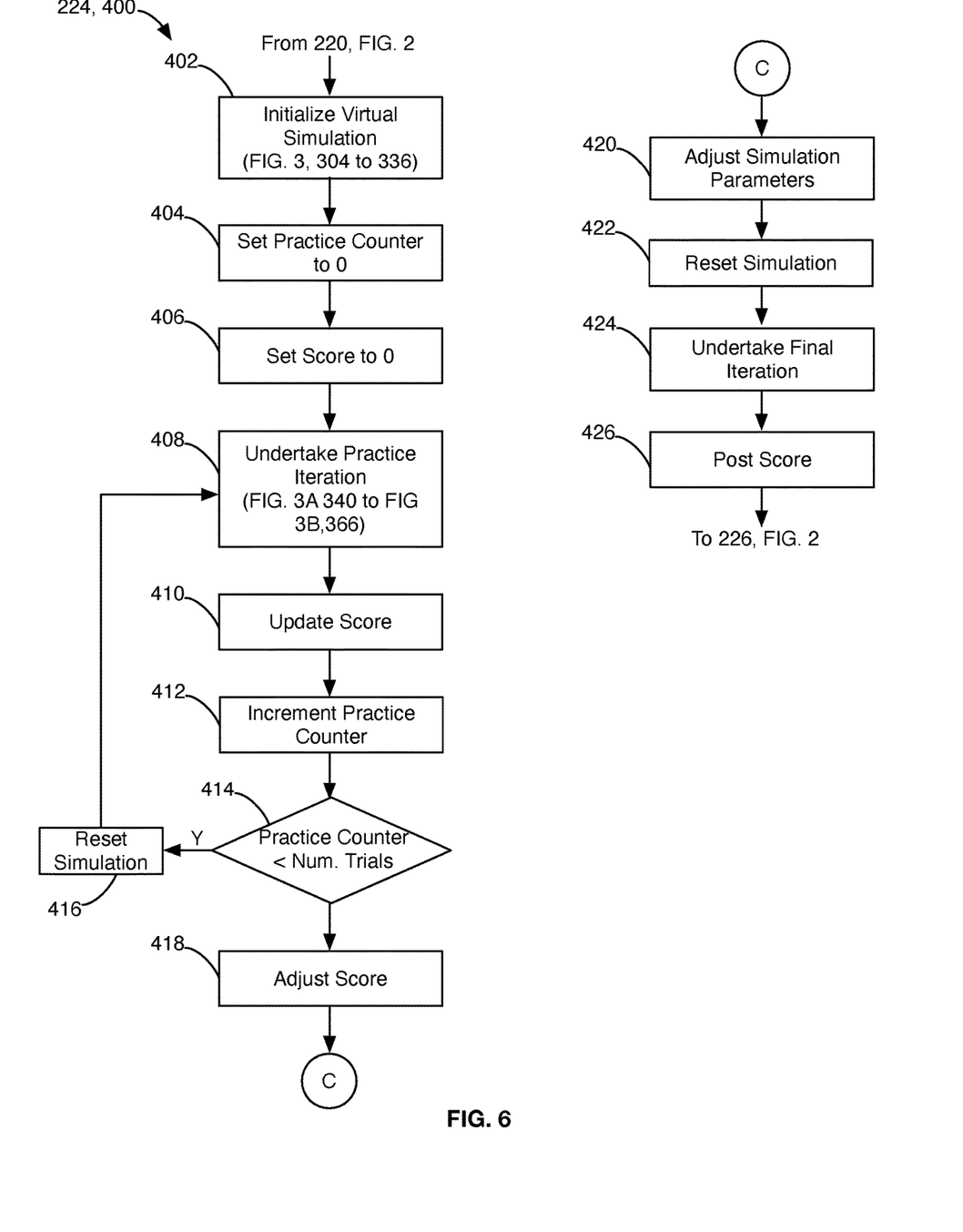
FIG. 6 is a flowchart of steps undertaken by a controller of the simulation system of FIG. 1 to conduct a plurality of iterations of a simulation.

FIG. 6 shows a flowchart 400 of the steps undertaken by the simulation system 100 that is configured to allow practice iterations of the simulation as described above. Referring to FIGS. 1, 2 and 6, if at step 220 the controller 102 determines that a virtual simulation should be run, the controller 102 proceeds to step 224 and undertakes the steps shown in the flowchart 400.

At step 402, the controller 102 initializes the virtual simulation environment by undertaking steps 304 through 306 shown in flowchart 300 of FIG. 3. Thereafter, the controller 102 sets values of a practice counter and a score to zero at steps 404 and 406, respectively. At step 408, the controller 102 undertakes steps 340-366 of the flowchart 300 shown in FIGS. 3A and 3B and monitors and responds to actions undertaken by the amateur player during a practice iteration of the simulation.

At step 410, the controller 102 updates the value of the score in accordance with the results of the practice iteration of the simulation undertaken at step 408. In particular, if the controller 102 determines that the amateur player successfully accomplished a charge foul (i.e., the controller 102 reached step 362 of FIG. 3B), the controller 102 increments the value of the score by a first predetermined score value associated with a charge foul. Alternately, if the controller 102 determines that the amateur player successfully accomplished a blocking foul (i.e., the controller 102 reached step 364), the controller 102 increments the value of the score by a second predetermined score value associated with a blocking foul. Preferably, the second predetermined score value is less than the first predetermined score value. If the controller 102 determines that the virtual professional athlete was able to undertake a blow-by maneuver (i.e., the controller 102 reach step 366), the value of the score is not modified or in some embodiments decremented by a third predetermined score value. After updating the score value, the controller 102 proceeds to step 412.

In some embodiments, the value of the first predetermined score is scaled before being added to the score value at step 410 in accordance with how much time elapsed between steps 346 (when the timer was started) and step 354 (when the 3-dimensional representation of the virtual player 320 intersected the 3-dimensional volume 330). In some embodiments, the value of the first predetermined score is multiplied by a scale factor determined in accordance with the difference between the elapsed time and the value of second predetermined time and such scaled first predetermined score value is added to the score at step 410. In other embodiments, the value of the predetermined score is multiplied by a scale factor determined in accordance with a ratio of the elapsed time and the value of the second predetermined time before being scaled second predetermined value is added to the score value at step 410. A greater difference between the elapsed time and the value of the second predetermined time results in a larger scale factor applied to the first predetermined score value to reward the greater skill of the amateur player.

In some embodiments, if the amateur player accomplishes a blocking foul, the second predetermined score value may be scaled in a similar manner in accordance with a difference between the elapsed time and the third predetermined time and the scaled predetermined score is then added to the score value at step 410.

At step 412, the controller 102 increments the practice counter by one. At step 414 the controller determines if the value of the practice counter is less than a predetermined number of practice iterations of the simulation allowed and if so proceeds to step 416. Otherwise, the controller 102 proceeds to step 418.

At step 416, the controller 102 resets the simulation by, for example, undertaking steps 312 through 336 of the flowchart 300 (FIG. 3) and returns to step 408 to undertake another practice iteration of the simulation.

At step 418, the controller 102 adjusts the value of the score accumulated during the practice iterations in accordance with the number of charge and/or blocking fouls the amateur player successfully completed. For example, the value of the score may be scaled in accordance with one or more of a number of the practice simulations that resulted in a charge foul, a number of the practice simulations that resulted in a blocking foul, a number of consecutive practice iterations of the simulation that resulted in charge foul, a number of consecutive practice iterations of the simulation that resulted in a blocking foul, and the like. The more skill displayed by the amateur player results in a higher scale factor applied to the score at step 418. Thus, for example, a particular number of consecutive iterations of the simulation that result in a charge foul is associated with a larger scaling factor than the same number of non-consecutive iterations of the simulation that result in a charge foul.

At step 420, the controller 102 evaluates the adjusted score calculated at step 418 against predetermined scores and adjusts parameters of the simulation accordingly. As discussed above, these parameters include one or more of the scale factors used to translate movement of the amateur player in the physical environment 302 into movement of the representation of the amateur player in the virtual environment and the values of the second and third predetermined times. For a skilled amateur player, the parameters are adjusted to make a final iteration of the simulation more difficult compared to the practice simulations undertaken at step 408. For a less skilled player, the parameters are adjusted to make the final iteration of the simulation easier.

At step 422, the controller 102 resets the simulation as described above in connection with step 416 and undertakes the final iteration of the simulation at step 424 with the parameters adjusted as described above. At step 426, the controller 102 posts the score (as adjusted in step 418) and/or an indication of how well the amateur player undertook the final iteration of the simulation at step 424 on a display. Such display may be a leaderboard in the physical environment and/or in the virtual environment and show the scores with a predetermined number of amateur players who have undertaken the simulation.

After step 426, the controller 102 proceeds to step 226 (FIG. 2) to determine if the amateur player would like to undertake another simulation.

As would be apparent to one who has ordinary skill in the art, the avatar of the referee or professional athlete described above is a computer-generated 3-dimensional representation of the referee or professional athlete. The controller 102 generates and renders such avatar in accordance with parameters stored in the content database 116 and animates the 3-dimensional representation to indicate movement thereof.

Referring to FIG. 5, in some embodiments, the 3-dimensional volume 330 is static during the simulation. In other embodiments, the 3-dimensional volume 330 represents a professional virtual player that moves in the virtual environment 308 as the amateur player in the physical environment 302 causes the representation of the virtual player 320 to move in the virtual environment 308.

In one embodiment, the position sensor(s) 108 and head set 110 are components of the VIVE system manufactured by the HTC corporation of New Taipei City, Taiwan. Further, components of the controller 102 to facilitate the virtual simulation described herein may be implemented using the Unity engine. Another position sensor, head set, and/or simulation engine apparent to one having ordinary skill may also be used.

Although the embodiments disclosed herein are provided in the context of an amateur and professional basketball players, it should be apparent that these embodiments may be adapted to other sports such as, for example, football, soccer, tennis, golf, and the like, and even to other non-sport activities in which physical differences between participants can influence the performance of such participants.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer, an application specific integrated circuit (ASIC), a field-programmable gate array (FPGA), or an electronic circuit. In some embodiments, some one or more of the most important method steps may be executed by such an apparatus.

It should be apparent to those who have skill in the art that any combination of hardware and/or software may be used to implement components of the controller 102 described herein. It will be understood and appreciated that one or more of the processes, sub-processes, and process steps described in connection with FIGS. 1-5 may be performed by hardware, software, or a combination of hardware and software on one or more electronic or digitally-controlled devices. The software may reside in a software memory in a suitable electronic processing component or system such as, for example, one or more of the functional systems, controllers, devices, components, modules, or sub-modules depicted in FIGS. 1-5. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller 102, which includes, for example, one or more microprocessors, general purpose processors, combinations of processors, digital signal processors (DSPs), field programmable gate arrays (FPGAs), application-specific integrated circuits (ASICs), and/or graphics processing units (GPUs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

Depending on certain implementation requirements, the embodiments described can be implemented in hardware and/or in software. The implementation can be performed using a non-transitory storage medium such as a digital storage medium, for example, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments accordingly comprise a data carrier having electronically readable control signals, which are capable of cooperating with a processor, a controller, or a programmable computer system, such that one of the methods described herein is performed.

Generally, embodiments disclosed herein can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment, therefore, may include a computer program having a program code for performing one of the methods described herein, when the computer program runs on a processor, a controller, and/or a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitory. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While particular embodiments of the present invention have been illustrated and described, it would be apparent to those skilled in the art that various other changes and modifications can be made and are intended to fall within the spirit and scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only and should not be taken as limiting the scope of the disclosure.

We claim:

1. A simulation system, comprising:
   a processor;
   a head-mounted display;
   a position sensing device; and
   a storage device having instructions stored therein that, when executed, cause the processor to:
   (a) receive user characteristics associated with a user in a physical environment where the position sensing device is disposed;
   (b) generate and display a 3-dimensional virtual environment in the head-mounted display;
   (c) select a destination location in the virtual environment;
   (d) receive from the position sensing device first position data over a period of time, wherein the first position data includes a first plurality of positions of the user in the physical environment;
   (e) develop second position data from the first position data, wherein the second position data includes a second plurality of positions associated with the user in the virtual environment;
   (f) determine from the second position data, a path and a first amount of time required for the virtual user to move from a predetermined starting location in the virtual environment to the destination location in the virtual environment;
   (g) develop a second amount of time from the first amount of time in accordance with the user characteristics;
   (h) select predetermined content from a plurality of predetermined content in accordance with the path and the second amount of time.

2. The simulation system of claim 1, wherein processor is caused to display the selected predetermined content in the head-mounted display.

3. The simulation system of claim 1, wherein the processor is caused to select a size of a basketball and a height of a basketball net in the physical environment in accordance with the user characteristics.

4. The simulation system of claim 1, wherein the motion sensing device comprises first and second handheld sensors, and each of the first plurality of positions is a three-dimensional position in the physical environment associated with the user holding the handheld sensors.

5. The simulation system of claim 1, wherein the processor is caused to adjust the virtual environment in response to receiving each one of the first plurality of positions.

6. The simulation system of claim 1, wherein the processor is caused to display a virtual obstacle in the virtual environment, and sequential positions of the virtual obstacle in the virtual environment are determined in accordance with sequential receipt of the plurality of first positions.

7. The simulation system of claim 1, wherein the processor is caused to generate a basketball court in the virtual environment and to generate a simulation of a basketball maneuver.

8. The simulation system of claim 1, wherein the processor is caused to select first predetermined content from the plurality of predetermined content if the second amount of time is less than a predetermined amount of time and to select second predetermined content from the plurality of predetermined content if the second amount of time is greater than the predetermined amount of time.

9. The simulation system of claim 1, wherein the processor is caused to calculate scale factors that are applied to the first position data to develop the second position data, wherein the scale factors are calculated in accordance with the user characteristics.

10. The simulation system of claim 9, wherein the scale factors comprise first scale factors, and the processor is caused to: (i) develop second scale factors from the first scale factors and the second amount of time, (j) receive from the position sensing device third position data, (k) develop fourth position data from third position data in accordance with the second scale factors, (l) determine from the fourth position data a path and a third amount of time required for the virtual user to move from the predetermined starting location to the destination location, and (m) select further predetermined control in accordance with the path and the third amount of time.

11. The simulation system of claim 1, wherein the first amount of time is measured from when the user in the virtual environment is positioned at the starting location for at a first predetermined amount of time.

12. A basketball simulation system, comprising:
a head set;
a position sensor;
a content database; and
a controller;
wherein the controller:
(a) develops a measurement of a physical characteristic of a player,
(b) generates and displays in the head set worn by the player a virtual basketball court scene comprising a starting location, a destination location, and an opponent,
(c) receives from the position sensor first positions of the player in a physical environment,
(d) translates the first positions of to second positions of a virtual player represented in the virtual basketball court scene,
(e) determines an amount of time required for the position of the virtual player to move from a starting location to a destination location, and
(g) determines an outcome in accordance with the amount of time and displays in the head set content from the content database in accordance with the outcome;
wherein at least one of the second positions and the amount of time is determined in accordance with the physical characteristic.

13. A computer-implemented method of undertaking a simulation using a head-mounted display and a position sensing device, comprising the steps of:
(a) receiving user characteristics associated with a user in a physical environment where the position sensing device is disposed;
(b) generating and displaying a 3-dimensional virtual environment in the head-mounted display;
(c) selecting a destination location in the virtual environment;
(d) receiving from the position sensing device first position data over a period of time, wherein the first position data includes a first plurality of positions of the user in the physical environment;
(e) developing second position data from the first position data, wherein the second position data includes a second plurality of positions associated with the user in the virtual environment;
(f) determining from the second position data, a path and a first amount of time required for the virtual user to move from a predetermined starting location in the virtual environment to the destination location in the virtual environment;
(g) developing a second amount of time from the first amount of time in accordance with the user characteristics;
(h) selecting predetermined content from a plurality of predetermined content in accordance with the path and the second amount of time.

14. The method of claim 13, further including selecting a size of a basketball and a height of a basketball net in the physical environment in accordance with the user characteristics.

15. The method of claim 13, wherein the motion sensing device comprises first and second handheld sensors, and each of the first plurality of positions is a three-dimensional position in the physical environment associated with the user holding the handheld sensors.

16. The method of claim 13, further including to adjusting the virtual environment in response to receiving each one of the first plurality of positions.

17. The method of claim 13, further including displaying a virtual obstacle in the virtual environment, and determining sequential positions of the virtual obstacle in the virtual environment in accordance with sequential receipt of the plurality of first positions.

18. The method of claim 13, wherein the processor is caused to calculate scale factors that are applied to the first position data to develop the second position data, wherein the scale factors are calculated in accordance with the user characteristics.

19. The method of claim 18, wherein the scale factors comprise first scale factors, and further including: (i) developing second scale factors from the first scale factors and the second amount of time, (j) receiving from the position sensing device third position data, (k) developing fourth position data from third position data in accordance with the second scale factors, (l) determining from the fourth position data a path and a third amount of time required for the virtual user to move from the predetermined starting location to the destination location, and (m) selecting further predetermined control in accordance with the path and the third amount of time.

20. The method of claim 13, wherein the first amount of time is measured from when the user in the virtual environment is positioned at the starting location for at a first predetermined amount of time.

\* \* \* \* \*